June 2, 1970 K. A. AUSTIN 3,514,945

GAS TURBINE ACCESSORY POWER DRIVE UNIT

Filed Oct. 4, 1968

INVENTOR.
KENNETH A. AUSTIN
BY Charles M. Hogan
Gary M. Gron
ATTORNEYS.

United States Patent Office 3,514,945
Patented June 2, 1970

3,514,945
GAS TURBINE ACCESSORY POWER DRIVE UNIT
Kenneth A. Austin, Hove, England, assignor to Avco
Corporation, Stratford, Conn., a corporation of Delaware
Filed Oct. 4, 1968, Ser. No. 765,195
Int. Cl. F02c 3/10, 7/02
U.S. Cl. 60—39.16                                   7 Claims

ABSTRACT OF THE DISCLOSURE

The disclosure illustrates an accessory drive unit for a gas turbine engine comprising a gas generator unit and a power turbine. A major accessory load requiring a substantial power input, even when the power turbine is not rotating, is driven by an air turbine which receives bleed air from the compressor of the gas generator. A centrifugal governor regulates the flow of bleed air to the air turbine to maintain a given output speed. The major accessory load is coupled to the power turbine through a set of gears and a one-way drive so that the major accessory load is coupled to the power turbine as soon as the power turbine is rotating at a rate sufficient to drive the accessory. Use of the compressor bleed air for accessory power at low power turbine speeds eliminates compressor surge and use of the power turbine at higher speeds minimizes the maximum gas generator temperatures. A minor accessory may be selectively driven by the power turbine or the rotating portion of the gas generator compressor through a series of one-way clutches to minimize the gas generator maximum temperatures imposed by operation of the minor operation load.

---

The present invention relates to gas turbine engines and more specifically to accessory drive units which provide a rotatable output from a gas turbine engine.

In recent years the gas turbine engine, after long use for aircraft propulsion, has become extremely desirable as a prime power plant for large off-highway construction equipment, amphibious military craft, and sea-going vessels. Besides offering almost vibrationless operation, a gas turbine engine is capable of generating a tremendous power output for a small engine size and weight.

In all of these applications the gas turbine engine has a prime power output for driving wheels or propellers of the particular vehicle and an accessory output that drives hydraulic pumps of a hydraulically driven accessory system. Generally the gas turbine engine is matched to the vehicle so that the primary power requirements of the vehicle are satisfied while the engine is operating at optimum conditions. In contrast, however, the accessory loads do not necessarily coincide with the prime power requirements. As a result, the accessory loads tend to impose a greater strain on the engine and cause the maximum internal temperatures of the engine to become elevated.

There have been a number of approaches in the past which have sought to minimize the temperature increases imposed by an accessory drive.

An example of a prior approach is found in U.S. Pat. No. 3,100,378, entitled "Auxiliary Power Drive Mechanism for a Gas Turbine Engine" in the name of Austin et al. and assigned to the same assignee as the present invention. In that patent an improved accessory drive was provided for a gas turbine engine having a compressor, combustor, an interconnected turbine to form a gas generator rotor, and a free power turbine forming an output rotor. An accessory to be driven was rotatably coupled to the power turbine rotor and to the gas generator rotor through appropriate gearing and a pair of one-way drives.

The gearing was selected so that the accessory would be selectively driven by the gas generator rotor or the power turbine rotor to minimize the maximum temperature of the gas generator resulting from direct driving of the accessory from its rotor.

This arrangement has proven quite successful in the handling of minor accessory loads. However, there is a problem when the engine is used in, for example, a large off-highway construction vehicle and the power turbine is directly connected to the vehicle wheels. Frequently the accessory units of off-highway vehicles require substantial amounts of power when the vehicle is stopped or at a relatively low speed. In this instance the operator is required to brake the vehicle wheels to stop the rotation of the power turbine and apply an increasing amount of power to enable the gas generator rotor to provide sufficient power to drive the accessory unit. As a result, the maximum temperature of the gas generator increases somewhat beyond the normal prolonged life temperatures of the engine and the compressor tends to be urged towards unstable operation.

Accordingly, it is an object of the present invention to provide with a gas turbine engine of the type generally described above, an accessory drive system which can drive an accessory unit requiring substantial amounts of power from the engine when the engine power turbine is rotating at a low rate while minimizing the maximum engine temperatures and providing stable compressor operation.

In one aspect of the present invention the above ends are achieved by an accessory drive for a two-rotor gas turbine engine comprising a first output shaft to directly couple the engine power turbine to a prime power ouput shaft and a second output shaft to connect with an auxiliary unit input shaft. A coupling means is provided for driving the second shaft by the first shaft, the coupling means including a one-way clutch so that when the rotational speed of the second shaft exceeds a predetermined level relative to the first shaft, the second shaft is decoupled from the first shaft. A turbine adapted to provide a rotatable output is connected to a means for providing an airflow path from a compressor of the gas generator unit. A means is provided for coupling the turbine to the second shaft, the turbine coupling means including a one-way clutch so that when the speed of the auxiliary drive shaft exceeds that of the turbine output shaft is decoupled from the turbine output shaft. A means is also provided for controlling the flow of air to the turbine so that when the rotational speed of the first shaft is relatively low the second shaft is driven by the turbine means and when the rotational speed of the first shaft is relatively high the auxiliary unit is driven by the power turbine.

The above and other related objects and features of the present inventuion will be apparent from a reading of the description of the disclosure found in the accompanying drawings and the novelty thereof pointed out in the appended claims.

Figure 1:
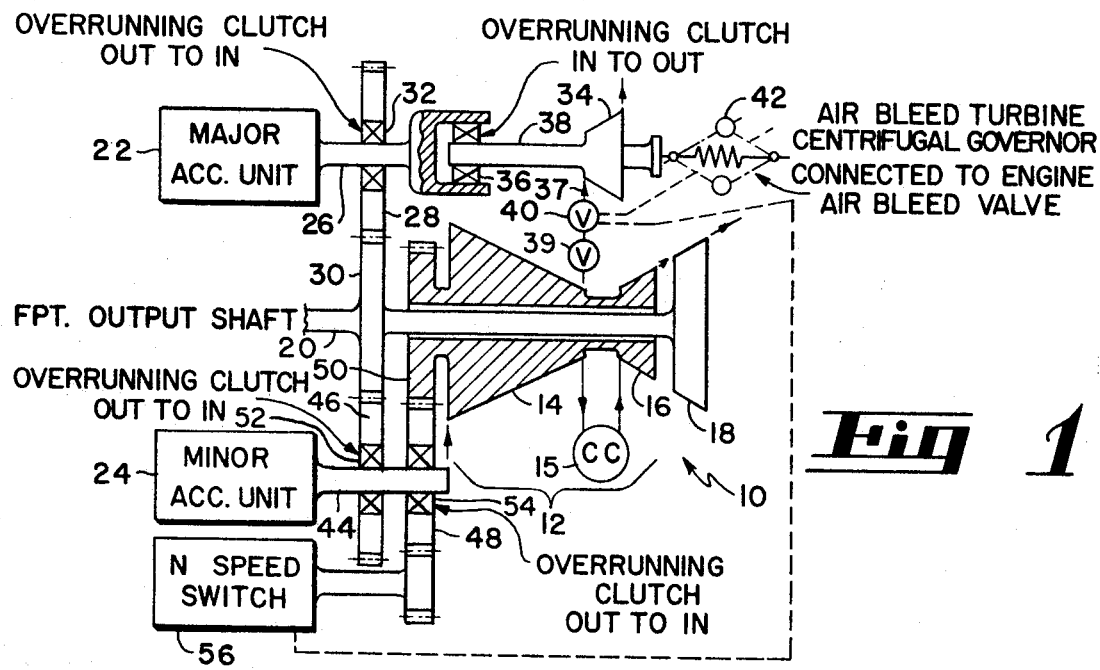
FIG. 1 is a highly diagrammatic showing of a gas turbine engine incorporating an auxiliary drive unit which embodies the present invention.

Referring now to FIG. 1 there is shown a gas turbine engine 10 with which the present invention may be used. The engine 10 includes a gas generator 12 comprising a rotatable compressor 14 which receives pressurized air for delivery to a combustion chamber 15 where fuel is mixed with the pressurized air and ignited to generate a hot gas stream which is discharged across a turbine 16. The compressor 14 and the turbine 16 are interconnected to form a rotor so that a portion of the energy of the hot gas stream passing across the turbine 16 is used to drive the compressor 14.

A free power turbine rotor 18 is positioned downstream of the gas generator turbine 16 to extract a major portion of the energy from the hot gas stream to drive a prime power output shaft 20. The prime power output shaft 20 is then used to provide a propulsive power for a vehicle which the engine is to power. In the case of an off-highway construction vehicle the free power turbine output shaft would be directly connected to the vehicle wheels through a suitable gearing system.

The engine 10 is also used to drive a major accessory unit 22 and a minor accessory unit 24. For an off-highway construction vehicle, a typical example of a major accessory unit would be a pump for a hydraulically actuated system used to tip a load of earth, steer the vehicle, or assist in braking. The load imposed on the pump by the operation of the hydraulic system for actuation of these devices is quite substantial and frequently exist at a time when the vehicle is stopped. A typical example of a minor accessory unit for an off-highway construction vehicle would be a fuel system pump, electrical generating apparatus, etc. The loads imposed on the engine by these minor accessories amount to a rather small percentage of the power available from the engines.

The major accessory unit 22 is driven through an accessory drive output shaft 26 which is rotatably coupled to the free power turbine output shaft 20 through a pair of intermeshing gears 28, 30. An overrunning clutch 32 is provided between the gear 28 and the shaft 26 so that when the r.p.m. of the shaft 26 exceeds the r.p.m. of gear 28 the major accessory unit 22 is decoupled from the free power turbine output shaft 20.

The shaft 26 is additionally coupled to an air turbine unit, generally referred to by reference character 34, through an overrunning clutch 36 which is positioned between the shaft 26 and the turbine output shaft 38. It should be noted that in the usual instance an air turbine unit comprises a turbine rotor which operates at an extremely high r.p.m. and a speed reduction gear train to provide a usable output. It is to be understood that in practice the turbine unit 34 would include such a gear train to provide an output r.p.m. consistent with the r.p.m. required by the major accessory unit 22.

The air turbine 34 is driven by bleed air from the gas generator compressor 14 which is connected to the turbine 34 via a conduit 37. A nozzle 39 is interposed in the conduit 37 and has a given fixed throat area relative to the flow area through the conduit 37. When the flow from the compressor 14 to the turbine 34 attains a given maximum limit, as later described, sonic flow is established at the throat of nozzle 39 to limit the maximum attainable flow through the conduit 37. A second valve 40 is also positioned in the conduit 36. The valve 40 has a variable area controlled by a centrifugal governor generally indicated by reference character 42. The governor 42 controls the flow area of the valve 40 in response to the r.p.m. of turbine 34 to maintain its rotational speed at a given level.

The minor accessory unit 24 is driven by a shaft 44 coupled to the free power turbine output shaft 20 through intermeshing gears 30 and 46 and to the rotor of the gas generator 12 through intermeshing gears 48 and 50. A pair of overrunning clutches 52, 54 are respectively provided between the gears 46, 48 and the shaft 44. The overrunning clutches 52 and 54 are designed so that the shaft 44 is driven by the faster of the two gears 46 or 48. The gear ratios between the shaft 44, the power turbine output shaft 30 and the gas generator rotor are selected so that the minor accessory unit 24 is selectively driven by the gas generator or the power turbine to minimize the turbine inlet temperatures in the gas generator 12, as described in the previously mentioned U.S. Pat. No. 3,100,378.

As later described in detail, a speed swtch 56 responsive to the r.p.m. of the gas generator rotor may be used to switch the valve 40 from a closed position to an open operating position whenever the gas generator rotational speed exceeds a predetermined minimum level. This level is generally above the rotational speed necessary to start the engine so that heavy accessory loads will not impair the starting performance of the engine.

Figures 2, 3:
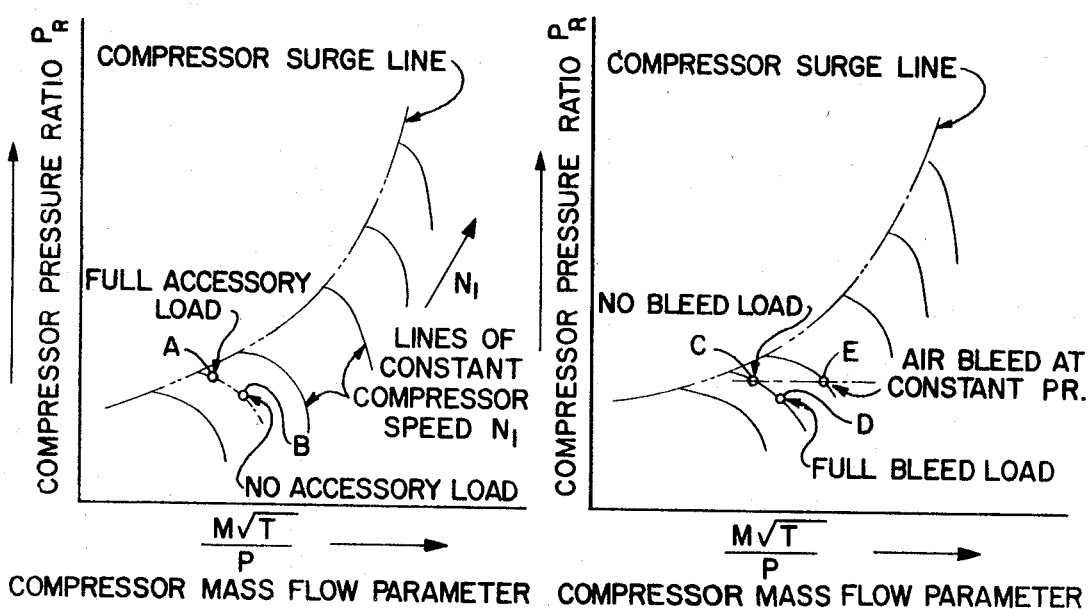
FIG. 2 is a compressor map for a gas turbine engine used in a prior art auxiliary drive unit.
FIG. 3 is a compressor map for the gas turbine engine shown in FIG. 1 which incorporates the auxiliary drive unit of the present invention.

Before discussing the operation of the accessory drive of FIG. 1, the operating characteristics of the prior art accessory drive unit previously described will be discussed. FIG. 2 illustrates what is known in the art as a compressor map for the compressor of a gas generator incorporated in an engine having an accessory drive as described in U.S. Pat. No. 3,100,378. When an accessory unit is being directly driven by the gas generator and it has a negligible power requirement, the operating characteristics of the compressor are generally as shown by point A on the compressor map of FIG. 2. It should be noted that the point A is well away from the compressor surge line. When the accessory unit requires a substantial power input and the power turbine is at a low r.p.m. the operating point of the compressor moves to point B and in a direction towards compressor surge. In addition, the turbine inlet temperature is substantially elevated. At this point B a relatively small change in the operating conditions may cause the compressor to go into surge, thereby seriously affecting the power output of the engine. If it then becomes necessary under these conditions to accelerate the vehicle, the acceleration of the engine must be substantially limited to prevent the occurrence of compressor surge. In order to provide a margin of safety it is frequently necessary to maintain the gas generator at a higher r.p.m. Consequently, it becomes necessary to apply a fairly substantial restraining force on the power turbine since the larger quantity of propulsive gases generated at the higher gas generator r.p.m. tends to exert a greater torque on the power turbine. In a vehicle installation this requires a heavy braking action when a major accessory is being operated.

In contrast to the system described above, the accessory drive of FIG. 1 operates as shown in FIG. 3 which illustrates a compressor map for the compressor 14 of the gas generator 12. In this case when the turbine output shaft r.p.m. is relatively low or stationary, as when a vehicle is stopped, the air bleed from the compressor 14 across the turbine 34 causes its output shaft 38 to rotate at a higher speed than the gear 28. As a result, the major accessory unit 22 is decoupled from the power turbine output shaft 20 and driven by the air turbine unit 34.

When the major accessory unit 22 has a relatively low power requirement the valve 40 schedules a low bleed flow to the turbine 34 and the compressor 14 operates at point C. If the load requirements of the accessory unit 22 increase while the power turbine is still at a low speed or stationary, the governor 42 controls the valve 40 to schedule an increasing amount of bleed air to the turbine 34 to maintain its given speed. As bleed air from the compressor 14 is increased the turbine inlet temperature increases but the compressor is moved away from the surge line to point D. Therefore a substantial margin of safety is provided when the major accessory unit is being operated at low power turbine rotational speeds.

It is apparent from the operating characteristics in FIG. 3 that when the compressor goes from no-bleed load at point C to a full-bleed load at point D, the compressor pressure ratio $P_R$ decreases. If it is desired to maintain a constant compressor pressure ratio, the engine may be accelerated to a higher compressor r.p.m. to point E so that the compressor pressure ratio $P_R$ is the same as the ratio for a no-bleed load. In either case, however, the compressor is operating at a point substantially displaced from the compressor surge line, therefore enabling a substantial increase in the rate of acceleration of the engine when the major accessory unit is being operated.

It should be noted that during the above conditions the decrease in mass flow across the turbine 16 also causes a decrease in mass flow across the power turbine 18. As a result, a lower torque is exerted on the power turbine 18 which enables a substantial reduction in the force required to maintain the power turbine 18 in a stationary position while the major accessory unit 22 is being operated.

When the rotational speed of the power turbine is increased by releasing the brakes in a vehicle and allowing it to move forward, the gear 28 will eventually exceed the r.p.m. of the shaft 26 so that the overrunning clutch 32 causes the major accessory unit 22 to be driven by the power turbine output shaft 20. When this happens the air turbine 34 requires the relatively small bleed flow to maintain the speed called for by the governor 42. As a result the air turbine 34 turns over at an idle speed which in the usual instance is somewhat lower than its r.p.m. when it is driving the major accessory unit 22. When the accessory unit 22 is driven by the power turbine output shaft 20 the turbine inlet temperatures of the gas generator are decreased to normal operating temperatures from the higher level during compressor bleed.

The r.p.m. at which the turbine output shaft 20 takes over driving the major accessory unit 22 is chosen by selection of the ratio between the gears 28 and 30 so that the turbine takes over the driving of the major accessory load at the lowest possible r.p.m. consistent with proper operation of the accessory unit 22. This minimizes the increase in turbine inlet temperatures caused by extraction of bleed flow to drive the turbine 34. While the particular speed ratio will vary for particular vehicle requirements, a ratio of 3 to 4 between the gears 28 and 30 has proven to be suitable. It should be pointed out, however, that the main criteria is to have the power turbine output shaft 20 drive the major accessory unit as soon as its rotational speed is up to a level sufficient to be within the operating range of the major accessory unit 22.

The minor accessory unit 24 is driven selectively from the power turbine output shaft 20 or the gas generator rotor to minimize the effect of the minor accessory unit 24 on the turbine inlet temperatures of the gas generator 12. The minor accessory load may be driven in this manner since its maximum load requirements do not impose a severe requirement on the gas generator when the power turbine 18 is at a low rotational speed.

It is noted that the valve 38 limits the maximum flow conditions attainable through the conduit 37. This is done to provide an upper limit on the amount of power for driving the major accessory unit 22 from the engine 10. Additionally, the speed switch 56 may be incorporated to eliminate the potentially variable load of the major accessory unit 22 on the starting performance of the engine 10. The r.p.m. at which the switch 56 places the valve 40 in an operating condition is then selected at a level above idle speed for the engine 10.

The selective use of the compressor air bleed to drive a major accessory unit for low turbine rotor speeds enables a substantial margin of safety in the operating conditions of the engine. Furthermore, the major accessory load is driven by the power turbine as soon as its speed is sufficient to meet the requirements of the accessory unit to greatly minimize the increases in turbine inlet temperatures caused by the extraction of compressor bleed to drive the accessories.

While the preferred embodiment of the present invention has been described, it is apparent that the invention may be practiced as otherwise shown without departing from its spirit and scope.

Accordingly, what is claimed as novel and desired to be secured by Letters Patent of the United States is:

1. An accessory drive for a gas turbine engine having a gas generator including a compressor, combustor and gas generator turbine and a power turbine driven by gases from said gas generator, said gas turbine engine being adapted to provide a prime power output and to drive a major accessory unit requiring a substantial power input, said accessory drive comprising:
   a power turbine shaft coupled to said power turbine to provide said prime power output;
   a major accessory drive shaft adapted to connect with said auxiliary unit;
   means for rotatably coupling said major accessory drive shaft to said power turbine shaft whereby said major accessory drive shaft is driven by said power turbine shaft, said power turbine shaft coupling means including a one-way clutch so that when the rotational speed of said major accessory drive shaft exceeds a predetermined level relative to that of the power turbine shaft the major accessory drive shaft is decoupled from said first shaft;
   an air turbine adapted to provide a rotatable output;
   means for providing a flowpath for air from the compressor of said gas generator unit across said air turbine, thereby to rotate said air turbine;
   means for coupling said air turbine to said major accessory drive shaft, said turbine coupling means including a one-way clutch so that when the speed of said major accessory drive shaft exceeds that of the power turbine shaft said major accessory drive shaft is decoupled from said power turbine shaft; and
   means for controlling the flow of air to said air turbine so that when the rotational speed of said power turbine shaft is relatively low the major accessory drive shaft is driven by said air turbine and when the rotational speed of said power turbine shaft is high the major accessory drive shaft is driven by said power turbine.

2. An accessory drive as in claim 1 further comprising: means for limiting the maximum flow of air through said flowpath means to said air turbine to limit the amount of energy derived from said gas generator compressor to drive said major accessory drive shaft.

3. An accessory drive as in claim 2 wherein said flow-limiting means comprises: a nozzle having a throat area relative to the flow area of said flowpath means so that sonic flow is established at the nozzle throat for said maximum flow condition.

4. An accessory drive as in claim 1 wherein said flow control means comprises: means responsive to the rotational speed of said air turbine for controlling the flow of air thereto to maintain a given rotational speed.

5. Apparatus as in claim 4 wherein said speed control means comprises:
   a variable area valve interposed in said flowpath means; and
   a governor mechanism responsive to rotational speed of said air turbine for controlling the area of said valve.

6. An accessory drive as in claim 1 wherein:
   said means for coupling said major accessory drive shaft to said power turbine shaft includes a pair of intermeshing gears having a speed ratio therebetween which permits the major accessory drive shaft to be selectively driven from the power turbine as soon as the power turbine has a sufficient rotational speed to drive the accessory unit;
   whereby the gas generator turbine inlet temperature is minimized.

7. An accessory drive as in claim 1 further comprising:
   a minor accessory drive shaft adapted to drive a minor accessory unit requiring a moderate power input;
   means for rotatably coupling said minor accessory drive shaft to the gas generator turbine, said coupling means including an over-riding clutch adapted to couple the minor accessory drive shaft to said gas generator turbine only when the gas generator turbine is driving said minor accessory drive shaft; and means for rotatably coupling said minor accessory drive shaft to said power turbine shaft, said coupling means including an over-riding clutch so that the minor accessory drive shaft is coupled to said power turbine shaft only when the minor accessory drive shaft is driven by said power turbine shaft;

whereby the minor accessory drive shaft is selectively driven by the gas generator turbine and the power turbine shaft to minimize the increase in the gas generator maximum temperatures imposed by operation of said minor accessory unit.

References Cited
UNITED STATES PATENTS 2,608,054 8/1952 Price.
2,612,020 9/1952 Griffith.
3,100,378 8/1963 Austin et al. _____ 60—39.16

CARLTON R. CROYLE, Primary Examiner

U.S. Cl. X.R.
60—39.18

PO-1050
(5/69)

UNITED STATES PATENT OFFICE
CERTIFICATE OF CORRECTION

Patent No. 3,514,945     Dated June 2, 1970

Inventor(s) KENNETH A. AUSTIN

It is certified that error appears in the above-identified patent and that said Letters Patent are hereby corrected as shown below:

Col. 2, line 47, after "shaft", first occurrence, insert -- the auxiliary drive shaft -- .

SIGNED AND
SEALED
SEP 15 1970

(SEAL)
Attest:

Edward M. Fletcher, Jr.
Attesting Officer

WILLIAM E. SCHUYLER, JR.
Commissioner of Patents